United States Patent [19]
Vavra et al.
[11] Patent Number: 4,858,643
[45] Date of Patent: Aug. 22, 1989

[54] FLUID FLOW STABILIZING APPARATUS

[75] Inventors: Randall J. Vavra, Orange; Michael Doyle, Tustin, both of Calif.
[73] Assignee: Unit Instruments, Inc., Orange, Calif.

[21] Appl. No.: 167,572
[22] Filed: Mar. 14, 1988
[51] Int. Cl.[4] .................... G05D 7/00
[52] U.S. Cl. .................... 137/486; 137/487.5; 138/46
[58] Field of Search .................... 137/625.3, 625.31, 599, 137/486, 487.5; 138/46, 45, 43

[56] References Cited

U.S. PATENT DOCUMENTS

| | | | |
|---|---|---|---|
| 839,073 | 12/1906 | Miner | 137/625.31 X |
| 944,026 | 12/1909 | Fowden | 137/625.3 X |
| 2,953,167 | 9/1960 | Smith | 138/46 X |
| 3,678,963 | 7/1972 | Betts et al. . | |
| 4,113,050 | 9/1978 | Smith . | |
| 4,271,866 | 6/1981 | Bey | 137/625.3 |
| 4,429,714 | 2/1984 | Hughes et al. . | |
| 4,487,062 | 12/1984 | Olin et al. . | |
| 4,497,202 | 2/1985 | Mermelstein . | |
| 4,522,058 | 6/1985 | Ewing | 138/44 X |
| 4,687,020 | 8/2987 | Doyle . | |

*Primary Examiner*—Alan Cohan
*Attorney, Agent, or Firm*—Fulwider, Patton, Lee & Utecht

[57] ABSTRACT

A fluid flow stabilizer which includes two pluralities of stabilizer units adjacent one another. Each unit includes a plurality of parallel axially extending tubules. The units are movable into different relative positions so that certain of the tubules of a unit are aligned in fluid communication with tubules of another unit. Index means are provided for fixing the units in different selected relative positions.

8 Claims, 2 Drawing Sheets

53
51
49
47
45
43

71
11
69
13
33
15
17
13
35
39
37
67
61
65
63
59
55
57

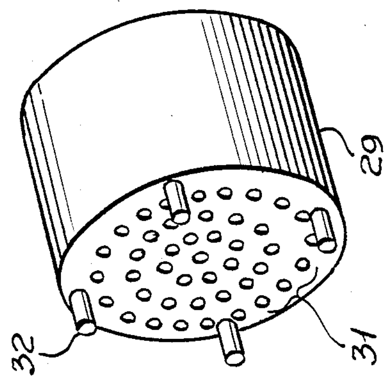
Fig. 3.
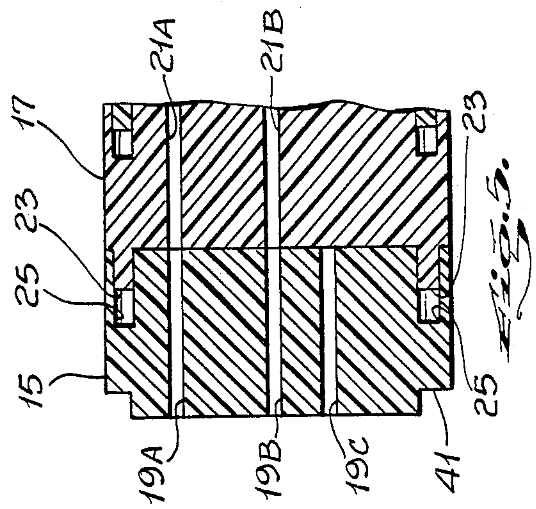
Fig. 5.
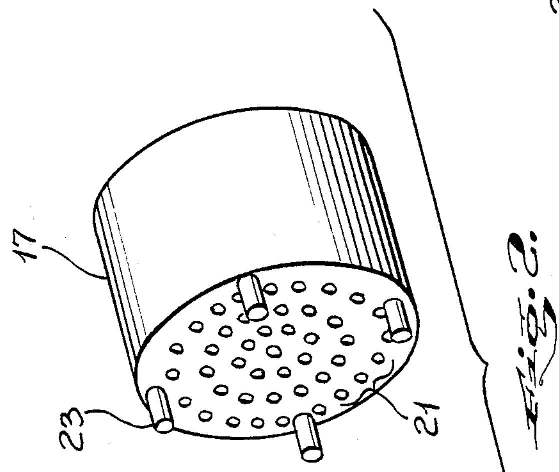
Fig. 2.
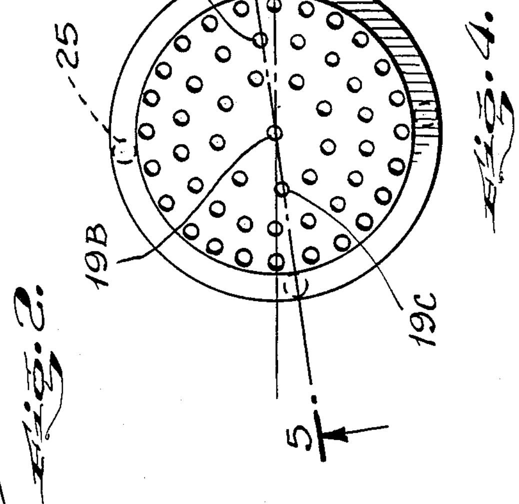
Fig. 4.
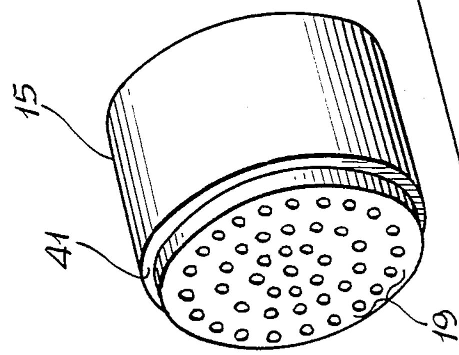

FLUID FLOW STABILIZING APPARATUS

BACKGROUND OF THE INVENTION

The present invention relates generally to apparatus for stabilizing the flow of a fluid and more particularly to apparatus which provides an adjustable quantity of tubules disposed in a fluid flow path to assure laminar flow of the fluid therethrough.

In a fluid which is flowing axially through an enclosed fluid flow path, the mass flow rate is proportional to pressure drop if the flow is laminar. However, if the flow is turbulent this proportional relationship does not hold. Operations such as fluid mass flow rate measurement and control cannot conveniently be accomplished unless the proportional relationship between the flow rate and the pressure drop is maintained, and therefore it is necessary to assure laminar flow conditions in order to carry out such operations.

Assuming a given viscosity and velocity, laminar flow of a fluid can be achieved by providing a fluid flow path characterized by a high ratio of length to effective hydraulic radius ("EHR"), where EHR is the cross-sectional area of the flow path divided by the perimeter thereof. If the length-to-EHR ratio of a given flow path is not high enough to assure laminar flow, said ratio can be increased by placing a flow restrictor characterized by a high length-to-EHR ratio across the path such that the fluid is constrained to flow through the restrictor. Various flow restrictors characterized by high length-to-EHR ratios have been proposed, and devices exemplary of such flow restrictors are disclosed in U.S. Pat. No. 4,497,202 issued to Mermelstein and in other references discussed therein.

Many flow restrictors are fabricated of metal or the like and are subject to attack by corrosive fluids. Some such fluids attack one kind of metal and some attack another. Accordingly, if a device which requires a flow restrictor is to be usable with more than one corrosive fluid, several flow restrictors made of different materials may have to be provided, one such restrictor being installed at any given time according to the particular fluid then in use.

In addition, a given flow restrictor functions optimally over a limited range of fluid flow parameters such as temperature, density, viscosity, flow rate and pressure. Hence several flow restrictors, each optimized for different values of these parameters, must be kept on hand and installed as needed.

From the foregoing, it will be apparent that there is a need for a fluid flow stabilizer which can achieve laminar flow of a fluid in an enclosed flow path, which is not adversely affected by corrosive fluids, and which is readily adjustable for optimum performance over various ranges of fluid flow parameters.

SUMMARY OF THE INVENTION

The present invention provides a fluid flow stabilizer which assures laminar flow of a fluid in an enclosed fluid flow path and which is readily adjustable for optimum results over various ranges of fluid flow parameters. A stabilizer according to the invention has a small number of parts, is simple and economical to manufacture and is not adversely affected by corrosive fluids.

A fluid flow stabilizer according to the invention includes a primary enclosure defining a primary fluid flow path, a plurality of stabilizer units located adjacent one another in the primary flow path, each such unit defining a plurality of tubules, and index means which can be adjusted to locate the stabilizer units in any of a plurality of relative positions.

Various ones of a first of the pluralities of tubules are brought into fluid communication with various ones of another of the pluralities of tubules to define a first quantity of stabilizer fluid flow paths when the stabilizer units are located in a first relative position, and various ones of said first plurality of tubules are brought into fluid communication with various ones of another of the pluralities of tubules to define a second quantity of stabilizer fluid flow paths when the units are located in a second relative position.

Each such stabilizer path is characterized by a stabilizer length-to-EHR ratio high enough to assure laminar flow of a fluid therethrough.

The performance of the stabilizer is optimized for fluid flow parameters such as temperature, density, viscosity, flow rate and pressure by changing the quantity of stabilizer flow paths which are open to the fluid. This is done by adjusting the index means so as to bring a desired quantity of tubules in one of the stabilizer units into fluid communication with tubules in another of the units to define the desired quantity of flow paths, for example by locating one of the units in any of a plurality of positions with respect to a second unit or by locating one of the units adjacent any of a plurality of other units.

In a preferred embodiment, an additional stabilizer unit defining an additional plurality of tubules is locatable in the primary flow path adjacent the stabilizer units which are already in the primary flow path such that various ones of the additional tubules are in fluid communication with various ones of the stabilizer fluid flow paths to increase the lengths of the stabilizer flow paths and thereby further optimize performance of the stabilizer.

The stabilizer units are fabricated of material such as KEL-F, TFE, PLA or other chemical resistant plastic which resists attack by corrosive fluids.

In a preferred embodiment the enclosure includes a shoulder extending into the primary flow path. A first one of the stabilizer units abuts the shoulder, and retaining means such as a spring retains the units in position in the flow path, for example by urging the units toward the shoulder.

A fluid flow stabilizer according to the invention is advantageously used to assure laminar flow of a fluid through a primary flow path of a fluid mass flow meter. A secondary enclosure defines a secondary fluid flow path which is in fluid communication with he primary path to receive a portion of a fluid flowing in the primary path at a point upstream from the stabilizer units and to discharge said fluid back into the primary flow path at a point downstream from said units. A fluid mass flow sensor in thermal or other communication with the secondary flow path senses the mass flow rate of the fluid through the secondary flow path and provides a signal indicative of the measured mass flow rate. The flow rate in the secondary path is proportional to the flow rate in the primary path and hence the total flow rate in both paths is readily calculable from the measured flow rate in the secondary path.

A fluid mass flow controller is provided by adding a flow control valve to a mass flow meter of the kind described above. The valve is responsive to the signal to control the rate of mass flow of the fluid.

Other aspects and advantages of the present invention will become apparent from the following detailed description taken in conjunction with the accompanying drawings which illustrate by way of example the principles of the invention.

BRIEF DESCRIPTION OF THE DRAWINGS

FIG. 2 is a perspective view of the stabilizer units of the embodiment of FIG. 1, shown spaced apart for clarity;

FIG. 3 is a perspective view of a stabilizer unit which replaces one of the units shown in FIG. 2;

FIG. 4 is a right end view of the fluid flow stabilizer of the embodiment of FIG. 1;

FIG. 5 is a section view taken along the line 5—5 of FIG. 4.

DESCRIPTION OF THE PREFERRED EMBODIMENT

Figures 1, 6:
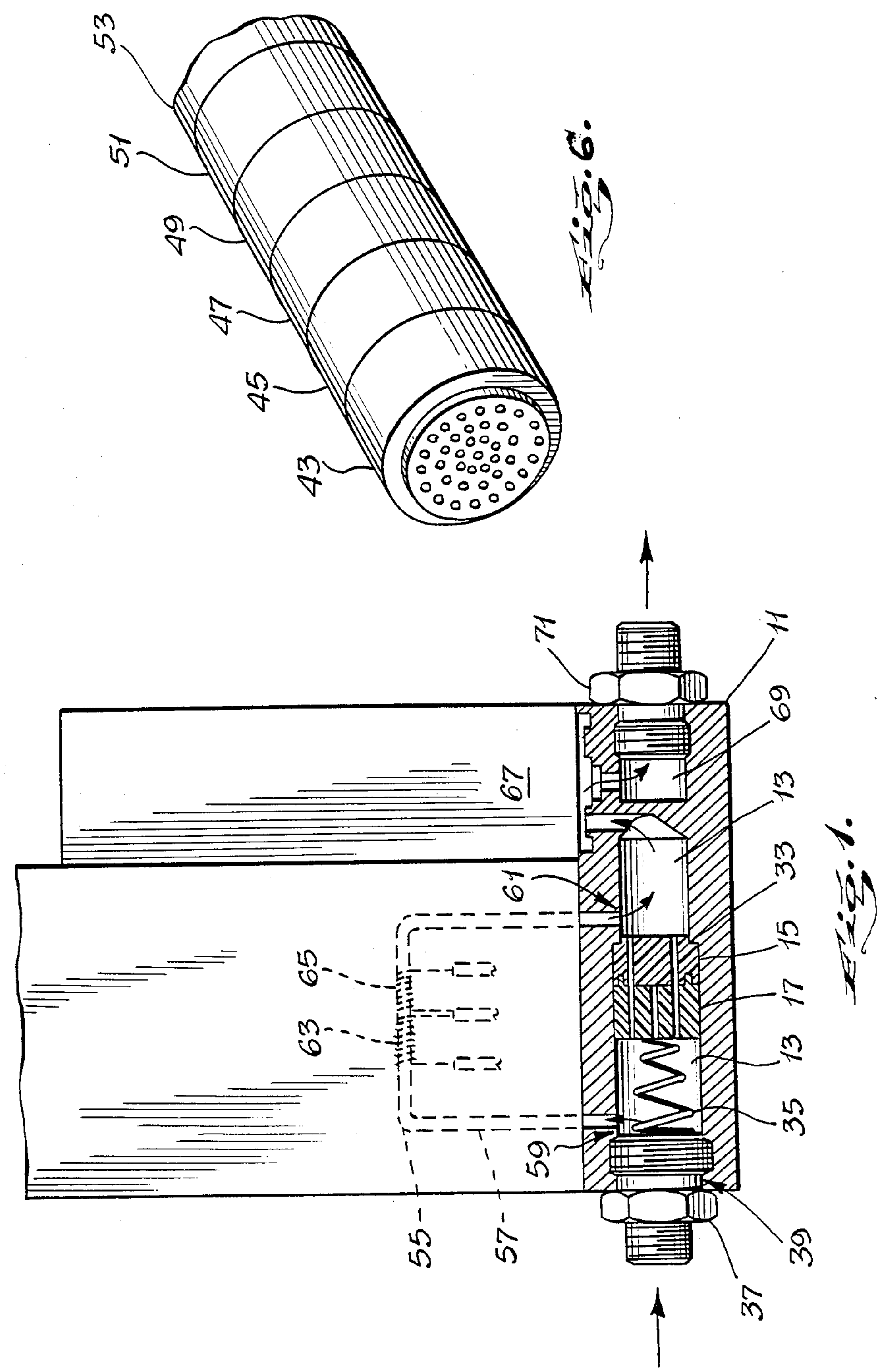
FIG. 1 is a plan view, partly in cut-away section, of a fluid mass flow controller including a fluid flow stabilizer embodying the novel features of the invention.
FIG. 6 is a perspective view of a fluid flow stabilizer assembly which includes a plurality of stabilizer units of the kind utilized in the embodiment of FIG. 1.

As shown in the drawings for purposes of illustration, the invention is embodied in a fluid flow stabilizer which provides an adjustable quantity of stabilizer fluid flow paths to assure laminar flow of a fluid through a primary flow path. Various types of flow restrictors have been utilized to achieve laminar fluid flow, but there has been a need for a flow stabilizer which is not subject to attack by corrosive fluids and which can be adjusted for optimum performance under various ranges of fluid flow parameters.

In accordance with the invention, a plurality of stabilizer units are disposed in a primary fluid flow path. Each unit defines a plurality of tubules. Adjustable index means locates the units in any of a plurality of relative positions and thereby brings various ones of one of the pluralities of tubules into fluid communication with various ones of another of the pluralities of tubules to define a plurality of stabilizer fluid flow paths. These stabilizer flow paths assure laminar flow of a fluid through the primary flow path. The number and length of such stabilizer paths is adjusted to optimize performance according to such fluid flow parameters as temperature, density, viscosity, flow rate and pressure. The stabilizer units are fabricated of material which resists attack by corrosive fluids.

More particularly, fluid flow stabilizing apparatus according to the invention includes a primary enclosure 11 defining a primary fluid flow path 13, a plurality of stabilizer units such as the units 15 and 17 located adjacent one another in the primary flow path 13, each such unit defining a plurality of tubules such as the pluralities 19 and 21 of tubules defined by the units 15 and 17, respectively, and index means adjustable to locate the stabilizer units in any of a plurality of relative positions, as shown in FIGS. 1 through 5.

Various ones of a first of the pluralities of tubules such as the plurality 19 of tubules are in fluid communication with various ones of another of the pluralities of tubules such as the plurality 21 of tubules to define a first quantity of stabilizer fluid flow paths when the stabilizer units are located in a first relative position. Similarly, various ones of said first plurality of tubules are in fluid communication with various ones of another of the pluralities of tubules to define a second quantity of stabilizer fluid flow paths when the units are located in a second relative position. Each stabilizer fluid flow path is characterized by a stabilizer length-to-EHR ratio high enough to assure laminar flow of a fluid therethrough.

The length-to-EHR ratio of a fluid flow path is defined as the length of the path divided by the effective hydraulic radius ("EHR") of the path. EHR in turn is defined as the cross-sectional area of the path divided by the perimeter thereof.

In a preferred embodiment the index means comprises means such as a plurality of index pins 23 carried by the stabilizer unit 17 and a plurality of complementary receptacles 25 in the unit 15 to receive the pins 23 to locate the stabilizer unit 15 in any of a plurality of positions with respect to the unit 17.

The position of the unit 17 relative to the unit 15 can be changed by adjusting the index means, specifically by separating the units 15 and 17 and then rotating one of them relative to the other so that different ones of the pins 23 are inserted into different ones of the receptacles 25, thereby changing the quantity of stabilizer fluid flow paths which extend through both units 15 and 17.

For example, when the first and second units 15 and 17 are located in a first relative position with respect t each other, as best shown in FIGS. 4 and 5, a tubule 19A of the first unit 15 comes into fluid communication and alignment like diameter with a tubule 21A of the second unit 17 to form a first stabilizer fluid flow path, and a tubule 19B of the first unit 15 comes into fluid communication and alignment with a tubule 21B of the second unit 17 to form a second stabilizer fluid flow path. However, a tubule 19C of the first unit 15 does not come into communication with any tubule of the second unit 17 and so no fluid flow path is formed by the tubule 19C.

If the first and second units 15 and 17 are located in a second relative position with respect to each other, various ones of the tubules 19 in the first unit 15 are brought into communication with various ones of the tubules 21 in the second unit 17 to form a different quantity of stabilizer fluid flow paths through the two units. In this manner the performance of the stabilizer can be optimized for various ranges of fluid flow parameters.

In another embodiment, the index means comprises means to locate one stabilizer unit such as the unit 15 adjacent any of a plurality of other stabilizer units such as the unit 17 or another stabilizer unit 29. Only one of the units 17 and 29 is located adjacent the unit 15 at any one time, the unused unit 17 or 29 being set aside when not in use.

The unit 29 has a plurality 31 of tubules arranged differently than the plurality 21 of tubules in the unit 17. When the unit 17 is located adjacent the unit 15, a certain quantity of stabilizer fluid flow paths is defined through the two units 15 and 17, as already described. When the unit 29 is located adjacent the unit 15, a different quantity of stabilizer fluid flow paths is defined through the two units 15 and 29. Thus, either the unit 17 or the unit 29 is utilized together with the unit 15 at any one time, the selection of the units 17 and 29 being made according to the quantity of stabilizer fluid flow paths which it is desired to establish through the units.

In this latter embodiment the index means includes, for example, a plurality of index pins 32 carried by the unit 29 in addition to the pins 23 carried by the unit 17 and the receptacles 25 defined in the unit 15. The location of the units 17 and 29 relative to the unit 15 can be changed by adjusting the index means, specifically by separating the unit 17 from the unit 15 such that the pins 23 are removed from the receptacles 25 and locating the unit 29 adjacent the unit 15 such that the pins 32 are inserted into the receptacles 25.

In a preferred embodiment the primary enclosure includes a shoulder 33 which extends into the flow path 13, for example annularly around the flow path as best shown in FIG. 1. The first stabilizer unit 15 abuts the shoulder 33 and another stabilizer unit such as the unit 17 is located on the opposite side of the first unit 15 from the shoulder 33. Retaining means, such as a spring 35, retains the stabilizer units 15 and 17 in position in the primary flow path 13 by urging the units toward the shoulder 33.

The spring 35 is held in place, for example by a plug 37 which carries male threads and which screws into complementary female threads in an inlet receptacle 39 in the enclosure 11 to compress the spring 35 between the plug 37 and the stabilizer units. Whenever it is desired to adjust the number of stabilizer fluid flow paths, it is only necessary to unscrew the plug 37, remove the spring 35 and the stabilizer units, and relocate the units with respect to each other or replace one of the units with another having a different pattern of tubules.

The first stabilizer unit 15 optionally includes means such as an annular recess 41 complementary to the shoulder 33 to locate the unit 15 in fluid-tight relationship with the shoulder 33 such that no fluid can flow through the flow path 13 except by passing through one of the stabilizer fluid flow paths which extend through the stabilizer units.

In a preferred embodiment, the stabilizer units are molded from a corrosion-resistant nonmetallic substance such as KEL-F, manufactured by Minnesota Mining and Manufacturing Co.

Suitable dimensions for the stabilizer units will vary according to the application and the values of the fluid flow parameters. For example, in one application of the invention in a mass flow controller for industrial process gases, each stabilizer unit has a diameter of about 0.5 inches, a thickness of about 0.25 inches, and a plurality of tubules each having a diameter of about 0.013 to 0.060 inches and a length (extending through the thickness of the stabilizer) of 0.25 inches.

A stabilizer assembly which consists of two such stabilizer units located adjacent each other thus defines a plurality of stabilizer fluid flow paths each having a diameter of about 0.013 to 0.060 inches and a length of about 0.5 inches (twice the length of a tubule in one of the stabilizer units).

In a preferred embodiment, performance of the stabilizer is optimized by increasing the length of the stabilizer fluid flow paths, for example by means of an additional stabilizer unit defining an additional plurality of tubules. This additional unit is locatable in the primary flow path adjacent the units which are already located there, with various ones of the additional plurality of tubules in fluid communication with various ones of the stabilizer fluid flow paths defined by the units already in the primary path to increase the length of the stabilizer flow paths.

In fact, a fluid flow stabilizer according to the invention can be made as long as desired simply by stacking stabilizer units one behind the other as necessary. For example, a stabilizer comprising six units 43, 45, 47, 49, 51 and 53 is shown in FIG. 6. These units are inserted into the primary flow path 13 one behind the other by removing the spring 35, inserting the units, and replacing the spring 35. In this manner, a fluid flow stabilizer having stabilizer fluid flow paths characterized by length-to-EHR ratios much longer than those which could conveniently be molded into a single unit can easily be assembled.

When a fluid flows into the receptacle 39 of the enclosure 11 and thence into the primary flow path 13, the fluid encounters the stabilizer units and is constrained to flow through the stabilizer flow paths which have been defined by various ones of the tubules in the units. Each such stabilizer flow path has a length-to-EHR ratio which is high enough to assure laminar flow of the fluid therethrough, and the stabilizer units thereby insure laminar flow through the primary path 13 even though the length-to-EHR ratio of the primary path 13 might be so low as to permit turbulent fluid flow if the stabilizer units were not present.

A fluid flow stabilizer which embodies the invention is advantageously used to assure laminar flow of a fluid through a primary flow path of apparatus such as a fluid mass flow meter. For example, as shown in FIG. 1 a secondary enclosure 55 defines a secondary fluid flow path 57 in fluid communication with the primary flow path 13 to receive a portion of a fluid flowing in the primary flow path at a point 59 upstream from the stabilizer units 15 and 17 and to discharge said fluid back into the primary flow path at a point 61 downstream from the stabilizer units.

The secondary flow path 57 is characterized by a secondary length-to-EHR ratio which is high enough to assure laminar fluid flow in the secondary path. The stabilizer units 15 and 17 in the primary flow path 13 assure that the flow through the primary path is also laminar. The mass flow rate of a fluid through a path is proportional to the pressure drop along that path provided the flow is laminar, and since the pressure drop along the secondary path 57 is equal to the pressure drop along the primary path 13 it follows that the mass flow rate through the secondary path 57 is proportional to the mass flow rate through the primary path 13.

The pressure drop along the primary path 13 is equal to the pressure drop along the secondary path 57 because the pressure drop along either path is measured between the points 59 and 61. Since the flow rates through both paths are proportional to the same pressure drop, and since the flow is laminar in both paths, it follows that the two flow rates are proportional to each other.

A fluid mass flow meter, for example of the kind utilized to measure the rate of mass flow of process gases, is implemented by adding fluid mass flow sensor means such as sensor elements 63 and 65 to the apparatus as already described. The sensor elements 63 and 65 are in thermal or other communication with the secondary flow path 57 to sense the rate of mass flow of the fluid through the secondary flow path 57 and to provide a signal indicative of said mass flow rate.

Because the flow rates through the primary and secondary paths are proportional, the total flow rate through both paths is readily calculable from the signal which indicates the flow rate through the secondary path.

A fluid mass flow controller is implemented by adding a valve 67 to such a mass flow meter. The valve 67 responds to the mass flow rate signal to control the rate of mass flow of the fluid. The valve 67 receives the fluid from the flow path 13 and discharges the fluid through an outlet receptacle 69. A plug 71 connects the receptacle 69 to another device (not shown) which receives the fluid.

From the foregoing it will be appreciated that a fluid flow stabilizer according to the invention provides a simple and economical means to assure laminar fluid flow in a fluid flow path by directing the fluid through a plurality of stabilizer flow paths characterized by a high length-to-EHR ratio. The number of such flow paths available to the fluid, and the lengths of the flow paths, can easily be adjusted for optimum performance with fluids of various viscosities, flow rates and pressures. The stabilizer is fabricated from material which resists attack by corrosive fluids and hence is readily adaptable for use in such applications as fluid mass flow meters and mass flow controllers employed to measure and control corrosive process gases and the like.

Although certain embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. Fluid flow stabilizing apparatus comprising:

primary means defining a primary fluid flow path;

first and second stabilizer units located adjacent one another in the primary flow path and including, respectively, a plurality of parallel, axially extending first tubules, and a plurality of parallel, axially extending second tubules parallel to the first tubules, the stabilizer units being movable into different relative positions in which certain ones of the first and second tubules are located in alignment and in fluid communication, and the others of the first and second tubules are out of alignment and thereby out of fluid communication index means for fixing the stabilizer units in a selected one of the different relative positions thereby to select a desired number of aligned first and second tubules having a length-to-EHR ratio high enough to assure laminar flow of a fluid therethrough.

2. Apparatus according to claim 1 and further comprising one or more additional stabilizer units located adjacent the first and second stabilizer units and defining additional pluralities of trouble selectively alignable with the aligned ones of the first and second tubules to increase the lengths of the stabilizer fluid flow paths through the aligned first and second tubules.

3. Apparatus according to claim 1 and further comprising secondary means defining a secondary fluid flow path in fluid communication with the primary flow to receive a portion of a fluid flowing in the primary path at a point upstream from the stabilizer units and to discharge the fluid back into the primary path at a point downstream from the stabilizer units.

4. A fluid mass flow meter comprising:

fluid flow stabilizing apparatus according to claim 3; and sensor means in communication with the secondary flow path and operative to sense the mass flow rate of the fluid through the secondary flow path and to provide a signal indicative of the mass flow rate.

5. A fluid mass flow controller comprising:

a fluid mass flow meter according to claim 4; and a valve, responsive to the signal to control the rate of mass flow of the fluid.

6. Fluid flow stabilizing apparatus according to claim 1 including retaining means biased against the stabilizer units to urge their abutting extremities into fluid tight relation in the primary path.

7. Apparatus according to claim 6 wherein the retaining means comprises a spring operative to urge the stabilizing units together.

8. Fluid flow stabilizing apparatus comprising:

means defining a fluid path;

a plurality of circularly configured stabilizer units located in coaxial relation in the fluid flow path and including, respectively, pluralities of parallel, axially extending and straight tubules, the stabilizer units being rotatable relative to each other of the tubules of the respectable stabilizer units are in alignment and fluid communication, and the remainder of the tubules, are out of alignment and thereby out of fluid communication; and index means for fixing the stabilizer units in a selected one of the different rotated positions thereby to select a desired number of aligned tubules having a length-to-EHR ratio high enough to assure laminar flow of a fluid therethrough.

* * * * *

UNITED STATES PATENT AND TRADEMARK OFFICE
CERTIFICATE OF CORRECTION

PATENT NO. : 4,858,643

DATED : August 22, 1989

INVENTOR(S) : Randall J. Vavra/Michael Doyle

It is certified that error appears in the above-identified patent and that said Letters Patent is hereby corrected as shown below:

Column 4, line 26, delete "t" and insert --to--;

line 29, after "alignment" delete "like diameter" and before "tubule" insert --like diameter--;

Column 8, line 2, delete "trouble" and insert --tubules--;

line 34, after "fluid" insert --flow--;

line 39, after "other" insert --into different rotated positions in which certain ones--; and line 40, delete "respectable" and insert --respective--.

Signed and Sealed this

Twelfth Day of June, 1990

*Attest:*

HARRY F. MANBECK, JR.

*Attesting Officer*

*Commissioner of Patents and Trademarks*